US005825773A

United States Patent [19]
Shutoh et al.

[11] Patent Number: 5,825,773
[45] Date of Patent: Oct. 20, 1998

[54] SWITCHING SYSTEM FOR TRANSFERRING BROADCAST PACKET HELD IN BROADCAST BUFFER RECEIVED FROM INPUT PORT TO OUTPUT PORTS ACCORDING TO THE STATE OF EACH OUTPUT PORT

[75] Inventors: Shin'ichi Shutoh, Kokubunji; Junji Nakagoshi; Naoki Hamanaka, both of Tokyo; Hiroyuki Chiba, Hachioji; Tatsuo Higuchi, Fuchu; Shigeo Takeuchi, Hanno; Yasuhiro Ogata, Akishima; Taturu Toba, Kunitachi, all of Japan

[73] Assignees: Hitachi, Ltd.; Hitachi VLSI Engineering Corporation, both of Tokyo, Japan

[21] Appl. No.: 853,242

[22] Filed: Mar. 18, 1992

[30] Foreign Application Priority Data

Mar. 20, 1991 [JP] Japan ................................. 3-056471

[51] Int. Cl.⁶ .................................................. G06F 13/00
[52] U.S. Cl. ....................................................... 370/398
[58] Field of Search .................................. 395/200, 250, 395/500, 575, 275, 200.18; 379/9, 14, 220, 221; 370/231, 398, 416, 422, 471, 474, 476

[56] References Cited

U.S. PATENT DOCUMENTS

| | | | |
|---|---|---|---|
| 4,166,929 | 9/1979 | Sheinbein | 379/207 |
| 4,195,351 | 3/1980 | Barner et al. | 364/919 |
| 4,281,380 | 7/1981 | De Mesa et al. | 395/299 |
| 4,398,400 | 8/1983 | Bar | 62/508 |
| 4,412,281 | 10/1983 | Works | 395/182.02 |
| 4,527,237 | 7/1985 | Frieder et al. | 395/200.83 |
| 4,623,996 | 11/1986 | McMillen | 370/418 |
| 4,630,258 | 12/1986 | McMillen et al. | 370/411 |
| 4,663,706 | 5/1987 | Allen et al. | 395/200.64 |
| 4,667,191 | 5/1987 | Comroe et al. | 340/825.5 |
| 4,667,287 | 5/1987 | Allenet et al. | 395/800.3 |
| 4,679,189 | 7/1987 | Olson et al. | 370/396 |
| 4,747,130 | 5/1988 | Ho | 379/269 |
| 4,955,016 | 9/1990 | Eng et al. | 370/230 |
| 5,001,702 | 3/1991 | Teraslinna et al. | 370/392 |
| 5,001,706 | 3/1991 | Dighe et al. | 370/422 |
| 5,036,518 | 7/1991 | Tseung | 371/32 |
| 5,065,308 | 11/1991 | Evans | 395/182.09 |
| 5,091,905 | 2/1992 | Amada | 370/415 |
| 5,115,499 | 5/1992 | Stiffler et al. | 395/475 |
| 5,126,999 | 6/1992 | Muntar et al. | 370/415 |
| 5,129,077 | 7/1992 | Hillis | 395/500 |
| 5,130,975 | 7/1992 | Akata | 370/416 |

(List continued on next page.)

FOREIGN PATENT DOCUMENTS

| | | |
|---|---|---|
| 63-124162 | 5/1988 | Japan . |
| 3-209550 | 9/1991 | Japan . |
| 4-61777 | 2/1992 | Japan . |
| 5-28122 | 2/1993 | Japan . |
| 5-143553 | 6/1993 | Japan . |

OTHER PUBLICATIONS

*Computer Systems Design*, (Sanpo KK), pp. 216–218.

*Primary Examiner*—Moustafa M. Meky
*Attorney, Agent, or Firm*—Antonelli, Terry, Stout, & Kraus, LLP

[57] ABSTRACT

In a method of transferring packets in a network for a parallel processor system handling a one-to-one transfer packet to be transferred from a processor to another processor and a broadcast packet to be transferred from a processor to a plurality of other processors, a transfer request of a broadcast packet is preferentially selected and a check is made to detect whether or not a plurality of processors specified as receivers are in a state in which the packet can be received. The broadcast packet is transferred to the processors found to be in the state in which the packet can be received. The packet transfer is delayed for the other processors in a state in which the packet cannot be received. Namely, only when the state of the processors is changed to the state in which the packet can be received, the broadcast packet is transferred thereto.

23 Claims, 13 Drawing Sheets

U.S. PATENT DOCUMENTS

| | | | |
|---|---|---|---|
| 5,166,674 | 11/1992 | Baum et al. | 340/825.07 |
| 5,181,017 | 1/1993 | Frey, Jr. et al. | 395/200.69 |
| 5,222,085 | 6/1993 | Newman | 370/422 |
| 5,239,654 | 8/1993 | Ing-Simmons et al. | 395/800.2 |
| 5,251,299 | 10/1993 | Masuda et al. | 395/182.08 |
| 5,271,014 | 12/1993 | Bruck et al. | 395/182.02 |
| 5,280,474 | 1/1994 | Nickolls et al. | 370/389 |
| 5,301,273 | 4/1994 | Konishi | 395/200.76 |
| 5,301,322 | 4/1994 | Hamanaka et al. | 395/680 |
| 5,313,408 | 5/1994 | Goto | 395/200.66 |
| 5,321,813 | 6/1994 | McMillen et al. | 370/228 |

OPERATION OF SELECTOR
AND BROADCAST CONTROLLER
ASSOCIATED WITH
TRANSMITTER PE
IN BROADCAST OPERATION

OPERATION OF SELECTOR
AND BROADCAST CONTROLLER
ASSOCIATED WITH
RECEIVER PE
IN BROADCAST OPERATION

OPERATION OF RECEIVER PE

SWITCHING SYSTEM FOR TRANSFERRING BROADCAST PACKET HELD IN BROADCAST BUFFER RECEIVED FROM INPUT PORT TO OUTPUT PORTS ACCORDING TO THE STATE OF EACH OUTPUT PORT

BACKGROUND OF THE INVENTION

The present invention relates to a network for a parallel processor system, and in particular, to a network for a parallel processor system in which broadcast packets can be efficiently transferred to a plurality of processors in a broadcast operation.

As techniques for transferring packets in the prior art, there has been known, for example, a method of transferring data between processors in a parallel processor system described in the JP-A-01-267763. In this network system, when a packet received from an arbitrary processor is to be sent to another arbitrary processor, a destination processor number assigned to the destination of the packet is checked. Moreover, in a broadcast packet transfer, there is employed a bit designating a packet transfer path to achieve an efficient packet transfer. The processor includes a central processing unit (CPU) as a controller, storages such as a random access memory (RAM), a read-only memory (ROM), and a disk, and an interface circuit.

The conventional technology has been attended with two primary problems as follows.

First, in a case where a network transfers a broadcast packet received from a transmitting processor to a plurality of receiving processors connected to the network, the broadcast packet can be transferred only when all of the receiver processors are set to a state in which the packet can be received. Before the broadcast packet set to the wait state is completely transferred to the receiver processors, it is impossible to transmit a one-to-one transfer packet which is sent from a transmitter processor to a receiver processor.

In consequence, such a one-to-one transfer packet from a processor to a processor operable for reception of the packet is set to the wait state in the network or the transmitter processor. This lowers the utilization efficiency of the packet transfer route to the receiver processor.

Second, for an operation in which the network transfers packets received in input registers thereof from a plurality of processors to an identical receiver processor, only a priority level decision circuit has been disposed, namely, there have not been disclosed any specific methods and concrete circuits to assign transfer priority levels to the packets.

SUMMARY OF THE INVENTION

In order to solve the problems, the network includes four constituent elements in accordance with the present invention, namely, a broadcast buffer for outputting an output to each receiver processor, a broadcast controller for transferring a packet from a broadcast buffer to a processor operable for reception of the packet, first means for supplying the broadcast controller with a packet transfer request from a transmitter processor to a broadcast buffer, and second means responsive to packet transfer requests simultaneously issued respectively from the broadcast controller and the transmitter processor to an identical receiver processor for preferentially transferring a packet from the broadcast buffer thereto.

Description will now be given of the operation of the network according to the present invention.

When the first means sends to the broadcast controller a transfer request of a broadcast packet from the transmitter processor to the broadcast buffer, the broadcast controller writes the packet in the broadcast buffer. Subsequently, the broadcast controller checks to determine whether or not the processors connected to the network are in the packet receivable state and then issues a transfer request of the broadcast packet only to the processors which are in the packet receivable state. Furthermore, when the broadcast controller and a transmitter processor simultaneously issue a request of a packet transfer to an identical receiver processor, the second means suppresses the packet transfer request from the transmitter processor to transfer a packet from the broadcast buffer related to the broadcast controller to the receiver processor.

With provision of the network according to the present invention, there are developed the following advantages.

In an operation in which a broadcast packet is transferred from a transmitter processor to a receiver processor linked to a network, when the processor having received the broadcast packet processes the packet, it is possible for the processor to receive other packets independently of the states of the other processors. This consequently removes the disadvantage of the conventional technology that until all processors are set to the broadcast packet receivable state, the next broadcast packet or a one-to-one transfer packet is set to the wait state, namely, the packet cannot be transferred to the receiver processors in this situation.

When a broadcast controller and a processor simultaneously issue a request of a packet to an identical processor, the packet of the broadcast buffer can be preferentially transferred to the receiver processor.

DESCRIPTION OF THE PREFERRED EMBODIMENTS

Figure 1:
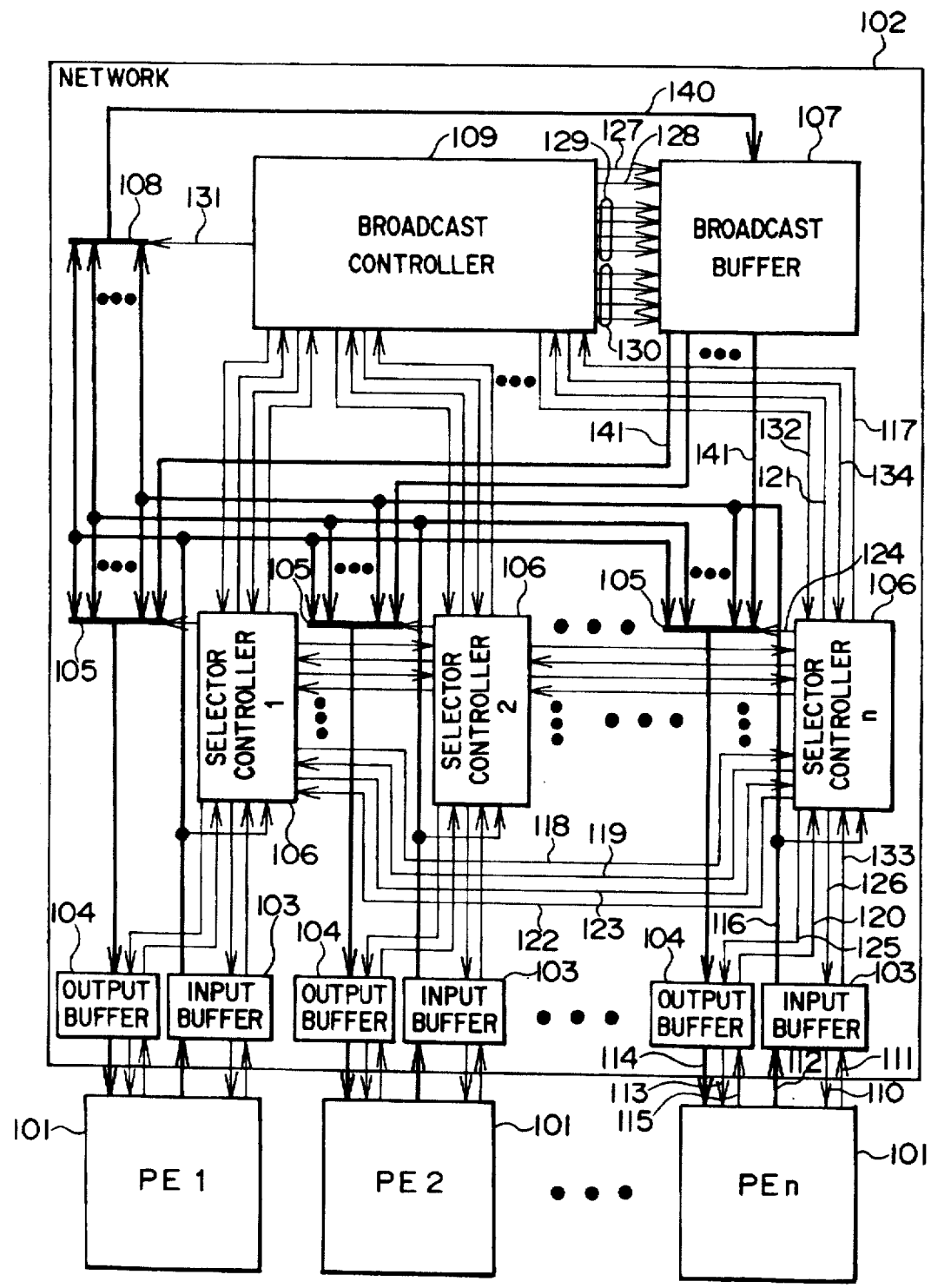
FIG. 1 is a schematic block diagram showing the configuration of a first embodiment of a parallel processor system using a network in accordance with the present invention.

Referring now to the drawings, description will be given of a first embodiment in accordance with the present invention.

FIG. 1 shows the configuration of a parallel processor system using a network in the first embodiment according to the present invention. The parallel processor system or parallel processor in short includes processors or processing elements (PEs) 101 and a network 102. The parallel processor includes n processing elements (PEs) connected to the network, where n is a natural number. The processing element 101 includes a control CPU, storages such as a RAM, a ROM, and a disk, and an interface circuit (not shown). The network 102 input buffers 103 and output buffers 104 for communicating packets between the processing elements 101, selectors 105 and selector controllers 106 for selecting packets to be sent to destination processing elements 101, a broadcast buffer 107 for storing therein broadcast packets, and a selector 108 for selecting packets to be stored in the broadcast buffer 107, and a broadcast controller 109. Each of the input buffers 103 and output buffers 104 is provided at each of input ports and output ports of the network 102. Although the network 102 of this embodiment is assumed to be used with crossbar switches, however, the present invention is not restricted by this constitution. For example, there may be adopted a multistage switch system in which the selector 105 is construated with a plurality of selectors. In this case, the selector 105 is disposed at a position just before an output buffer. In addition, there may be disposed a plurality of broadcast buffers 107 and a plurality of broadcast controllers 109 in association with the input buffers 103 or the output buffers 104.

A packet transferred between the processing elements 101 contains in a header field thereof at least a receiver PE number and a packet type. Two packet types are available, namely, a one-to-one transfer packet destined to only one receiver processing element 101 and a broadcast packet sent to a plurality of receiver processing elements 101.

The network 102 checks, on receiving a packet from an arbitrary one of the processing elements 101, a receiver PE number and a packet type described therein to transfer the packet to the arbitrary destination processing element(s) 101.

When an arbitrary processing element 101 issues a transfer request of a packet to an arbitrary destination processing element 101, the network 102 accomplishes its operation through three steps as follows.

(1) Transfer of the packet from the transmitter processing element 101 to an input buffer 103 of the network 102
(2) Transfer of the packet from the input buffer 103 to an output buffer 104 corresponding to the destination processing element 101
(3) Transfer of the packet from the output buffer 104 to the receiver processing element 101

The steps (1) to (3) will now be described in detail by reference to FIGS. 8 to 11 showing flowcharts related to the operation steps above. In the description, numerals enclosed in brackets denote associated step numbers.

Operation step (1)

When a Full signal 110 issued from the input buffer 103 of the network 102 is "0" |1|, the processing element 101 sends a Write Enable (WE) signal 111 designating a write request to the input buffer 103 of the network 102 [2]. In response to the WE signal 111 and a data line 112, data is written in the input buffer 103 of the network 102 |3|, thereby terminating the packet transfer.

Operation step (2)

In a packet transfer from the input buffer 103 to the output buffer 104, the selector controller 106 checks to determine the type of the packet. If the packet is of the one-to-one transfer type, the selector controller 106 reports existence of the packet to the selector controller 106 related to the destination processing element 101. If the packet is of the broadcast type, the selector controller 106 notifies existence of the packet to the broadcast controller 109, which in turn reports the existence of the packet to a plurality of destination selector controllers 106. Description will now be given in detail of the operations of the one-to-one transfer and broadcast packets, respectively.

(a) Operation of selector controller 106 to transmit one-to-one transfer packet

The selector controller 106 transfers, on confirming that the packet stored in the input buffer 103 under its control is of the one-to-one transfer type, the packet to an output buffer 104 under its control or to an output buffer 104 under control of another selector controller 106 associated with the destination. Moreover, a packet received from a source selector controller 106 is stored in an output buffer 104 under control of another selector controller 106 related to the transfer destination. Details of the three operations are as follows.

(i) Operation of selector controller 106 to notify a packet stored in an input buffer 103 under its control to another selector controller 106

Figure 2:
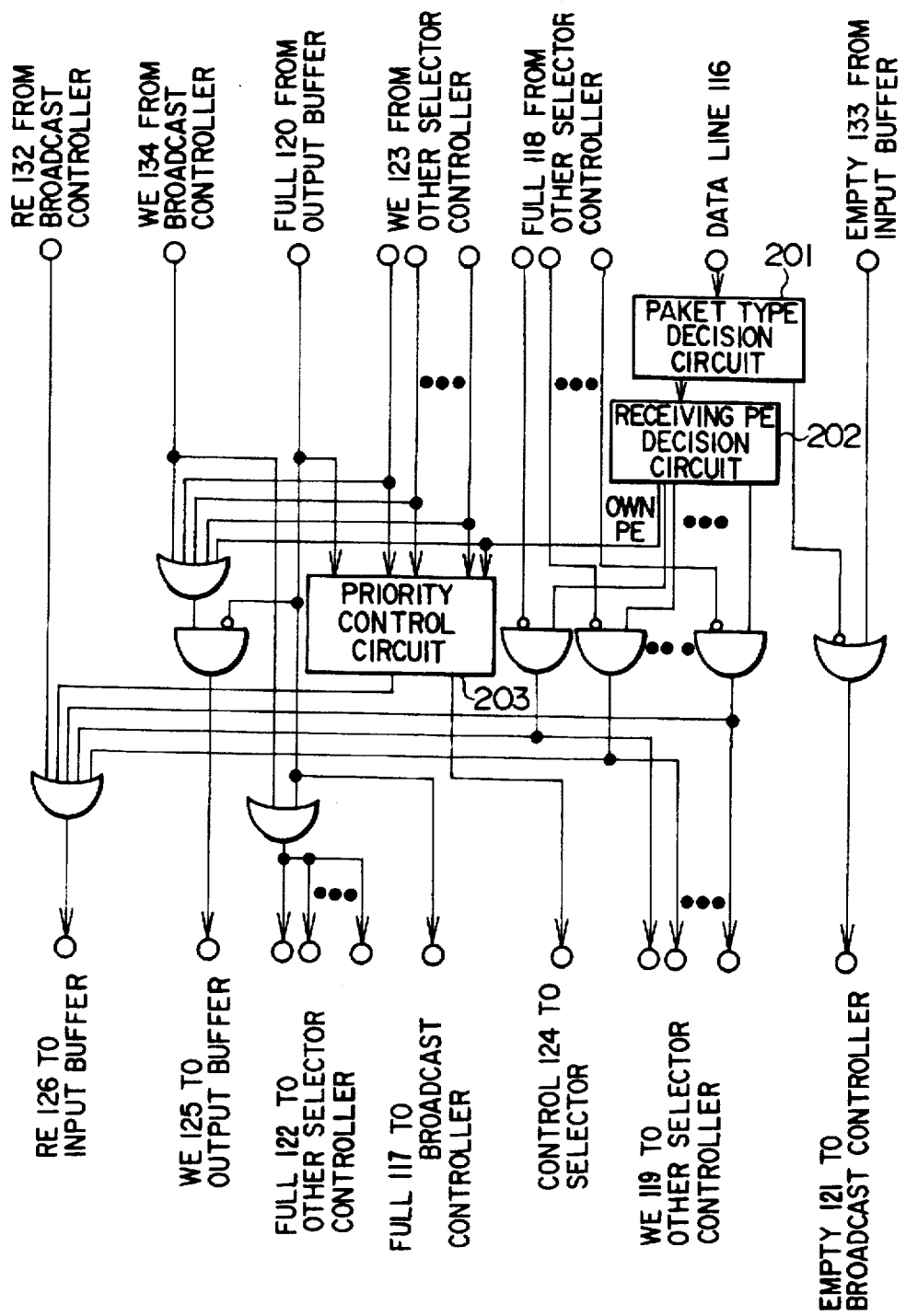
FIG. 2 is a diagram schematically showing an embodiment of a selector controller of the constitution of FIG. 1.

FIG. 2 shows the construction of the selector controller 106, which primarily includes a packet type decision circuit 201, a receiver PE decision circuit 202, and a priority control circuit 203. The selector controller 106 continuously monitors an Empty signal 133 indicating whether or not a packet from the PE 101 has been stored in an input buffer 103 under its control [4]. The Empty signal 133 is set to "0" if the packet has already been stored; otherwise, the Empty signal 133 is set to "1". Moreover, the controller 106 continuously monitors a Full signal 120 denoting whether or not a packet can be stored in an output buffer under control thereof. If this is the case, the Full signal 120 is set to "0"; otherwise, the Full signal 120 is set to "1".

When the Empty signal 133 is "0", a Read Enable (RE) signal 126 is sent to the input buffer 103 [5] and then the packet is read therefrom via a data line 116 [6]. The packet type decision circuit 201 then checks the header of the packet to decide whether or not the packet is of the one-to-one transfer type [7]. If this is the case, an Empty signal 114 as "1" designating that the packet is not a broadcast packet is delivered to the broadcast controller 109 [8].

Subsequently, the selector controller 106 confirms by the receiver PE decision circuit 202 that the packet is to be sent to another output buffer 104 of the destination |9|. Moreover, it is confirmed that the Full signal 118 from another selector controller 106 associated with the destination is "0", namely, the packet can be transferred to the destination output buffer 104 [10]. Thereafter, a WE signal 125 denoting a packet write request is issued to the destination output buffer 104.

(ii) Operation of selector controller to control transfer of packet from another input buffer 103 to output buffer 104 under its control The selector controller 106 transmits the Full signal 120 as a Full signal 121 to the broadcast controller 109 |13|. In addition, the Full signal 120 is sent as a Full signal 122 to the other selector controllers 106 |13|. Moreover, even in a state in which a packet can be stored in the output buffer 104, if a WE signal 134 is being issued from the broadcast controller 109 [14], the Full signal 122 set to "1" is delivered to the other selector controllers 106 [15] to notify that the broadcast packet takes precedence over the one-to-one transfer packets.

In a case where a transmission request from the broadcast controller 109 is missing, if a plurality of transmitters simultaneously issue transmission requests to a particular selector controller 106 [16], the selector controller 106 of the packet destination selects by the priority control circuit 203 thereof one of the WE signals 123 from the plural selector controllers 106 according to a particular selection method [17]. After the WE signal 123 is selected, a selector control signal 124 is issued to the selector 105 such that an input buffer 103 under control of the selector controller 106 having issued the selected WE signal 123 is selected as an input to the output buffer 104 [18]. Moreover, a WE signal 125 designating a write request is sent to the output buffer 104 [19] to write the packet therein, thereby terminating the transfer of the one-to-one transfer packet.

(iii) Transfer from input buffer 103 under control of selector controller 106 to output buffer 104 under control of the same If the Empty signal 133 from the input buffer 103 is "0" [4], the selector controller 106 issues an RE signal 126 to the input buffer 103 to read the packet via the data line 190 [6]. The packet type decision circuit 201 checks the header of the packet to decide whether or not the packet is of the one-to-one transfer type [7]. If this is the case, an Empty signal 117 denoting that the packet is other than a broadcast packet is issued to the broadcast controller 109 [8].

Next, the receiver PE decision circuit 202 checks to determine whether or not the packet is to be transferred to an output buffer 104 under control of the selector controller 106 of the packet transmitter [9]. Moreover, it is confirmed that the Full signal 120 from the output buffer 104 is "0", namely, the packet can be stored in the output buffer 104 [20]. When the priority 20 control circuit 203 selects the packet in the input buffer 103, a selector control signal 124 is issued to the selector 105, so that the selector 105 selects the input buffer 103 as an input to the output buffer 104 [21]. In addition, a WE signal 125 designating a write request is delivered to the output buffer 104 [22]; furthermore, an RE signal 126 denoting a packet read request is sent to the input buffer 103 [12], thereby terminating the transfer of the one-to-one transfer packet.

(b) Operations of selector controller 106 and broadcast controller 109 in broadcast packet transfer When a selector controller 106 confirms that a packet stored in an input buffer 103 under control thereof is a broadcast packet, the selector controller 106 transfers the packet to a broadcast buffer 107 supervised by the broadcast controller 109.

The broadcast controller 109 transfers the broadcast packet stored in the broadcast buffer 107 to output buffers 104 supervised by the respective selector controllers 106.

Description will now be given of operations of the broadcast controller 109 and selector controllers 106 in the broadcast packet transfer from the input buffer 103 to the broadcast buffer and in the broadcast packet transfer from the broadcast buffer 107 to the output buffer 104

(i) Broadcast packet transfer from input buffer 103 under control of selector controller 106 to broadcast buffer 107

Figure 3:
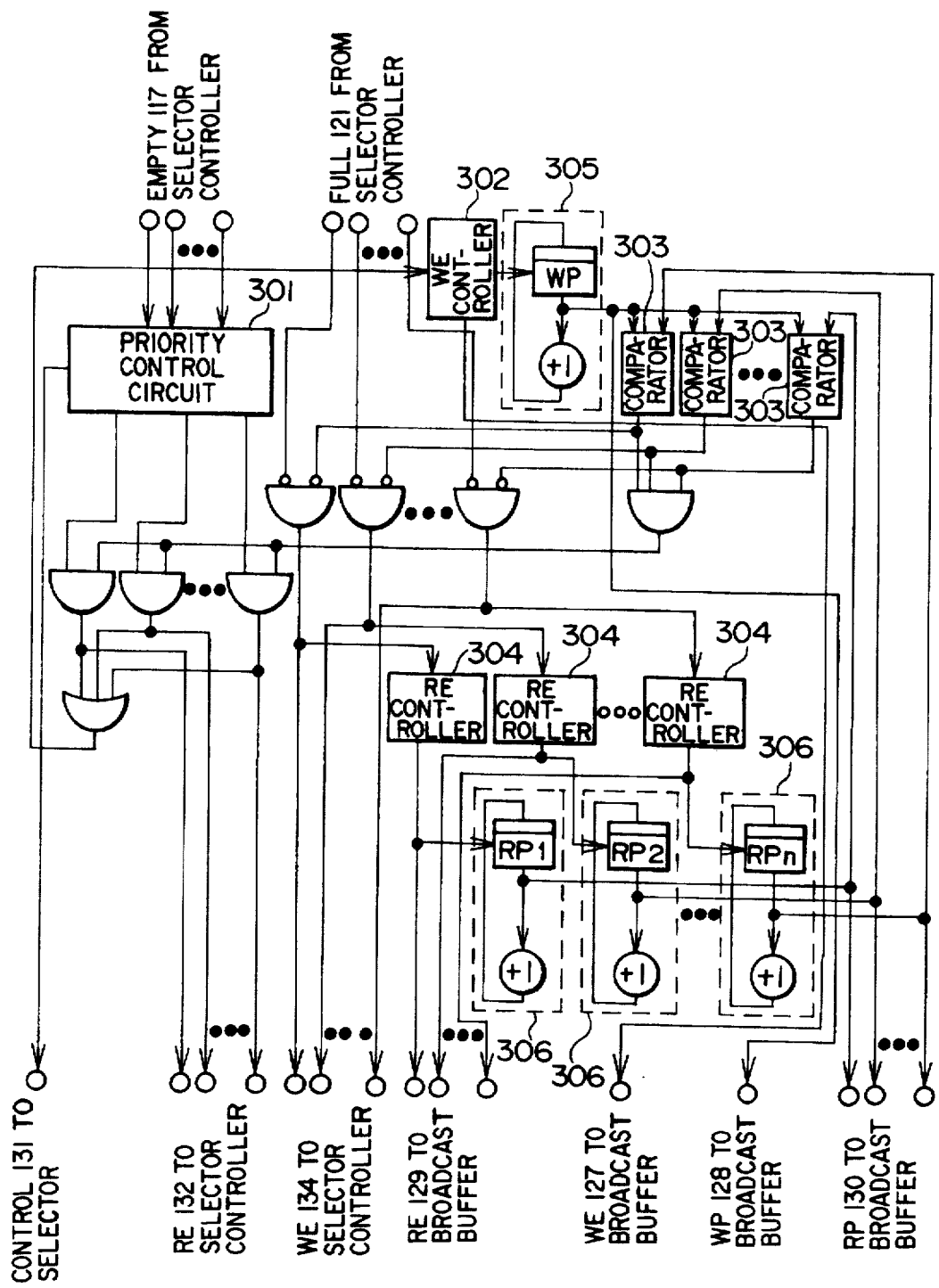
FIG. 3 is a diagram showing an embodiment of a broadcast controller in the structure of FIG. 1.

FIG. 3 shows the constitution of the broadcast controller, which mainly includes a priority control circuit 301, a WE controller 302, comparators 303 for comparing a value of a write pointer (WP) indicating a write address with values of a plurality of read pointers (RPs) each denoting a read address, RE controllers 304, a WP incrementer 305, and a plurality of RP incrementers 306. Each of the RPs is provided so as to correspond to each of the output buffers 104.

Figure 4:
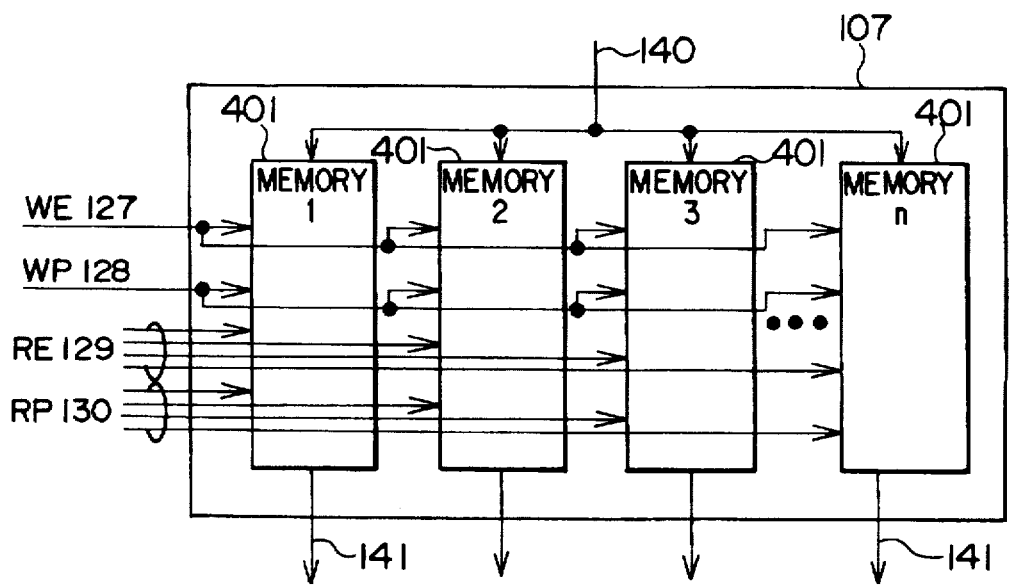
FIG. 4 is a diagram schematically showing an embodiment of a broadcast buffer in the constitution of FIG. 1.

FIG. 4 shows the structure of the broadcast buffer 107. In order to independently read a broadcast packet from the buffer 107 for each output buffer 104 supervised by a selector controller 106 related thereto, memories 401 are disposed as many as there are output buffers 104. The broadcast buffer 107 receives as inputs thereto a WE signal 127 for simultaneously writing a broadcast packet in the memories 401, a WP signal 128, a plurality of RE signals 129 for independently reading a broadcast packet, and a plurality of RP signals 130 indicating a read address in each memory 401.

When a packet is present in the input buffer 103, the selector controller 106 confirms that the Empty signal 133 from the input buffer 103 is "0" [4] and then sends an RE signal 126 to the input buffer 103 [5]. Thereafter, the controller 106 reads the packet from the data line 190 [6] and checks the header of the packet by the packet type decision circuit 201 to decide whether or not the packet is of the broadcast type [7]. If this is the case, the selector controller 106 supplies the broadcast controller 109 with an Empty signal 114 set to "0" denoting that the broadcast packet exists in the input buffer 103 [23].

On recognizing that the Empty signal 114 from the selector controller 106 is "0", the broadcast controller 109 selects by the priority control circuit 301 one of the empty signals 114 representing the existences of the broadcast packets from the other selector controllers 106 according to a particular selection method [24]. After the Empty signal 114 is selected, it is confirmed whether or not the packet can be stored in the broadcast buffer 107.

For the confirmation, the broadcast controller 109 compares the WP with each of the RPs by the comparators 303. If each comparison indicates that the WP is equal to the associated RP, it is determined that the packet can be stored in the broadcast buffer 107. Thereafter, the broadcast controller 109 issues a control signal 131 to control the selector 108 (FIG. 1) so as to select the input buffer 103 containing the broadcast packet as an input to the broadcast buffer 107 [25]. Moreover, the controller 109 sends to the broadcast buffer 107 a WE signal 127 designating a packet write request [26]. Resultantly, the broadcast packet is written via a line 140 (FIG. 4) in a location of each memory 401 at an address indicated by the RP, thereby terminating the transfer of the broadcast packet.

If the broadcast buffer 107 is not filled with packets, other broadcast packets are transferred to the broadcast buffer 107 by the broadcast controller 109 in response to transmission requests generated from the selector controllers 106.

(ii) Transfer of broadcast packet from broadcast buffer 107 to output buffer 104 supervised by selector controller 106

The broadcast controller 109 transfers a broadcast packet from the broadcast buffer 107 to each of the plural output buffers 104 in an independent manner. Even when some of the output buffers 104 as the destination are in a state in which the packet cannot be received, the broadcast packet is transferred to each of the available output buffers 104 in a state in which the packet can be received. Only after any unavailable output buffer 104 becomes to be available, the packet is transferred thereto. Description will now be given of the transfer operation of the packet to one of the output buffers 104.

When the Full signal 121 from a selector controller 106 controlling an output buffer 104 denotes that the packet can be stored in the buffer 104 [28], the broadcast controller 109 sends an RE signal 129 to a memory 401 disposed in association with the output buffer 104 [29] and then reads therefrom the broadcast packet via a line 141 [30]. Furthermore, the controller 109 transmits a WE signal 134 to the selector controller 106 related to the line 141 [31].

When the WE signal 134 is received, the selector controller 106 issues a control signal 124 such that the selector 105 selects the broadcast packet read from the broadcast buffer 107 [32] and then sends a WE signal 125 to the output buffer 104 so as to write the broadcast packet in the output buffer 104, thereby terminating the transfer of the broadcast packet. If the other broadcast packets exist in the broadcast buffer 107, they are sequentially transferred to the output buffers 104 by the broadcast controller 109. However, when the Full signal 121 from the selector controller 106 as the destination is "1" and hence the packet cannot be stored in the associated output buffer 104, the broadcast controller 109 waits an initiation of the transfer of the broadcast packet until the Full signal 121 is changed to "0". The operation above is concurrently achieved for the respective output buffers 104. The output buffer 104 to which the broadcast packet has been transferred can receive, regardless of the states of the other output buffers 104, the subsequent broadcast or one-to-one transfer packet.

(3) Transfer of packet from output buffer 104 of network 102 to PE 101

The output buffer 104 containing a packet sets the Empty signal 113 to "0" to send the signal to the PE 101 so as to notify the condition to the PE 101 [34].

On receiving the packet from the data line 114 [35], the PE 101 transmits an RE signal denoting the packet reception to the output buffer 104 [36], thereby terminating the packet transfer.

In the first embodiment, the memories 401 are arranged as many as there are output buffers 104 so that even in a case where the packet cannot be stored in all of the output buffers 104, when any unavailable output buffer 104 becomes to be available, the broadcast packet stored in the broadcast buffer 107 is transferred thereto independently of the other output buffers 104. However, in a second embodiment according to the present invention, in order to reduce the necessary memory capacity with a slight deterioration of functions, the broadcast buffer 107 is so configured to employ a memory shared among the output buffers 104. The second embodiment will now be described in detail.

The difference in the operation between the first and second embodiments resides only in the operation of the broadcast controller 109, namely, when a broadcast packet is transferred from a broadcast buffer under supervision of the broadcast controller 109 to an output buffer 104 under control of a selector controller 106. The operation above will be described primarily by reference to the drawings.

Figure 5:
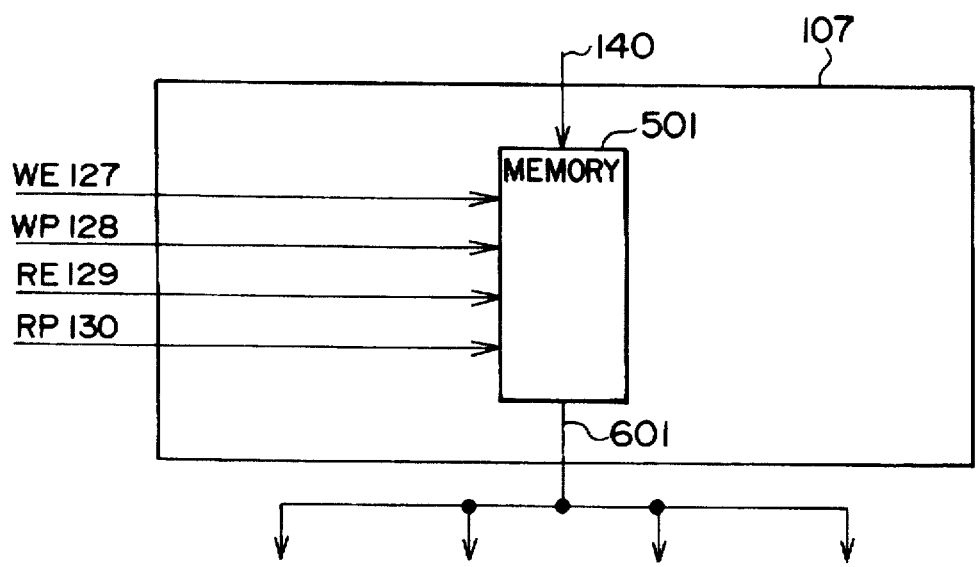
FIG. 5 is a diagram showing an embodiment of a broadcast buffer in the configuration of FIG. 6.

In the broadcast buffer 107 of the second embodiment, as shown in FIG. 5, a broadcast packet is stored in a memory 501 disposed to be shared among the output buffers 104.

Figure 6:
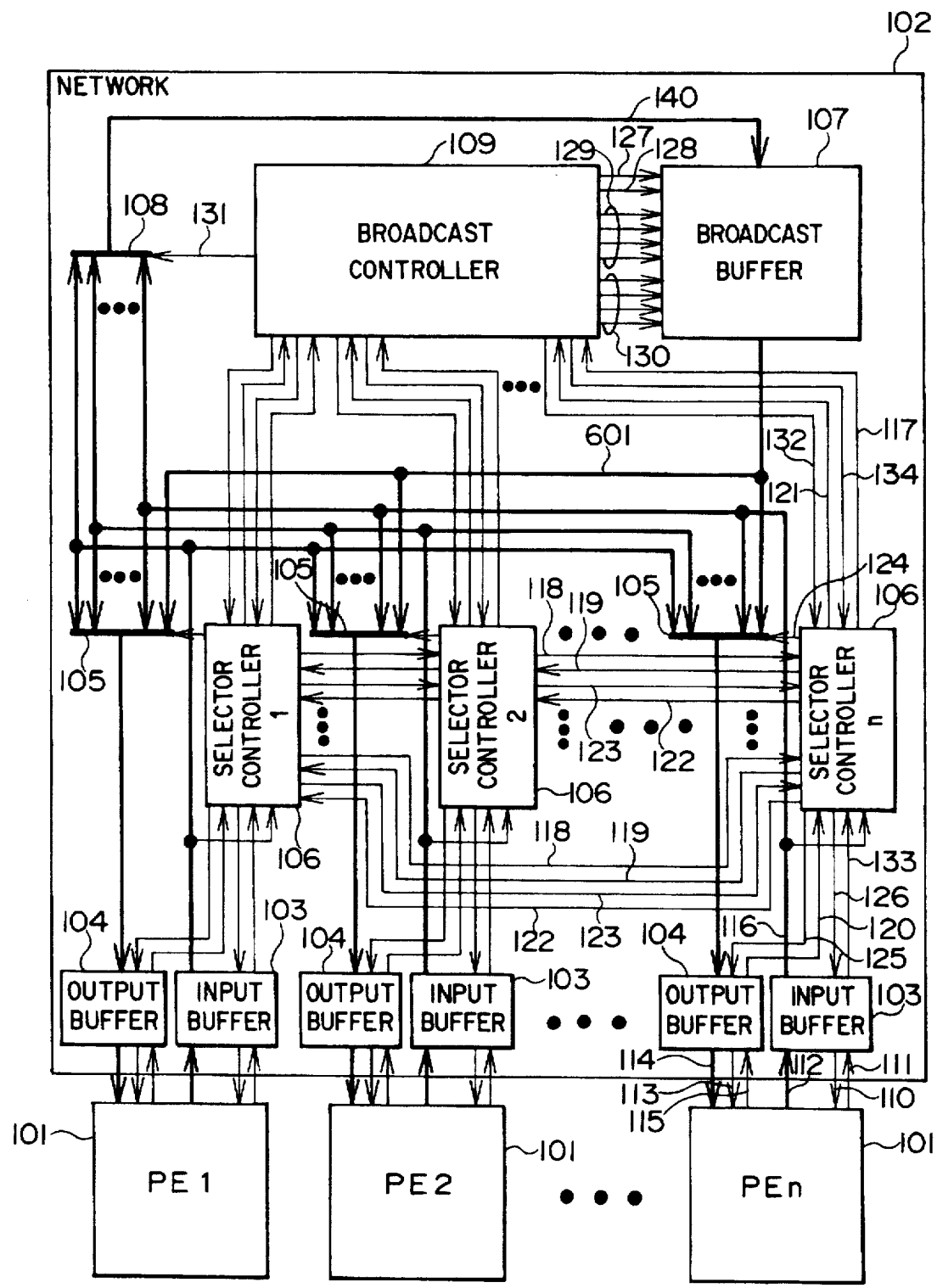
FIG. 6 is a schematic block diagram showing the configuration of a second embodiment of a parallel processor system using a network in accordance with the present invention.

FIG. 6 shows the overall construction of a parallel processor system associated with the configuration of FIG. 5. Each processor is structured in the same fashion as the processors of FIG. 1. The broadcast controller 109 transfers a broadcast packet from the broadcast buffer 107 via a data line 601 commonly used among the plural output buffers 104.

Figure 7:
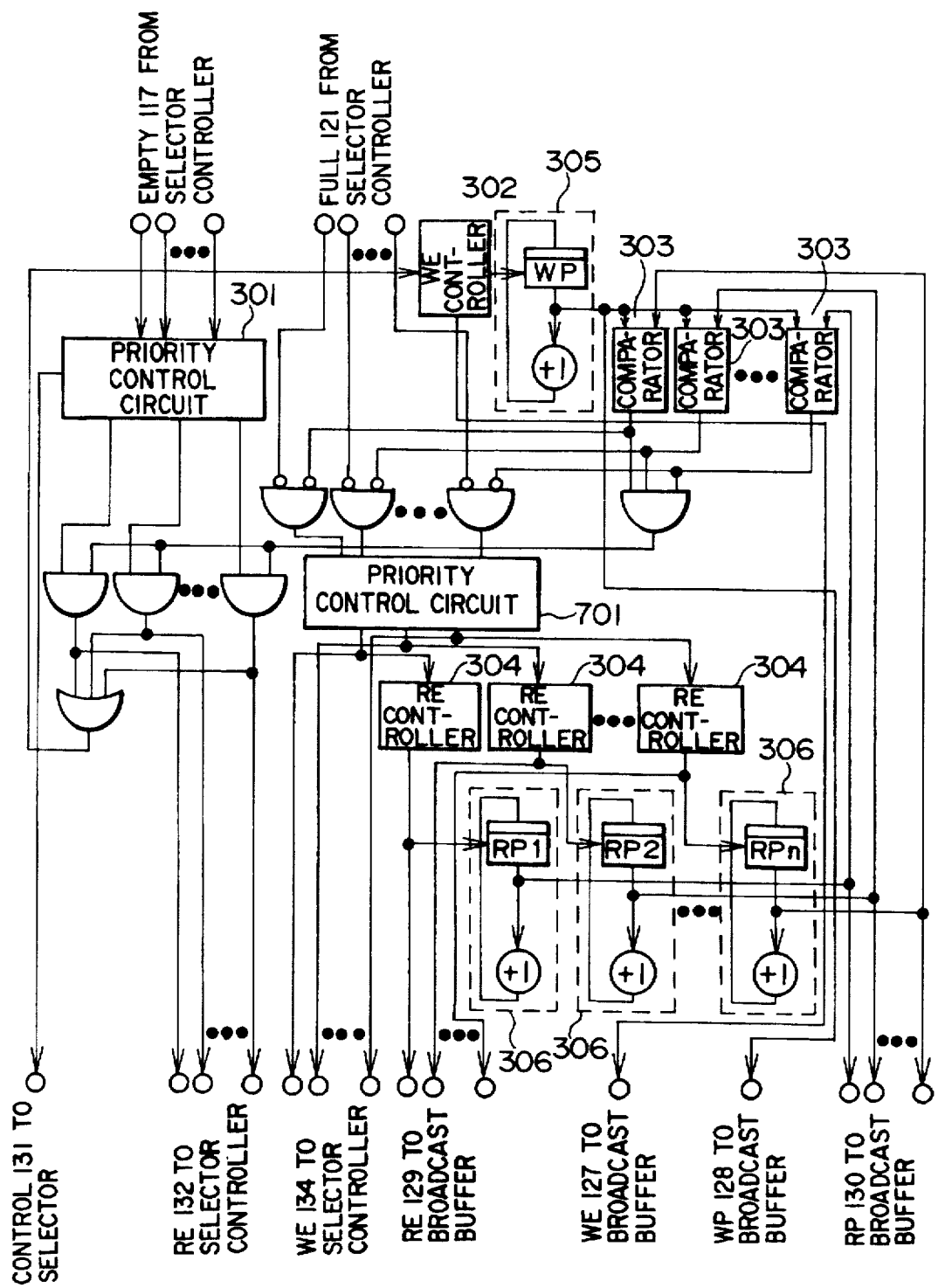
FIG. 7 is a diagram showing an embodiment of a broadcast controller in the structure of FIG. 6.
Figure 8:
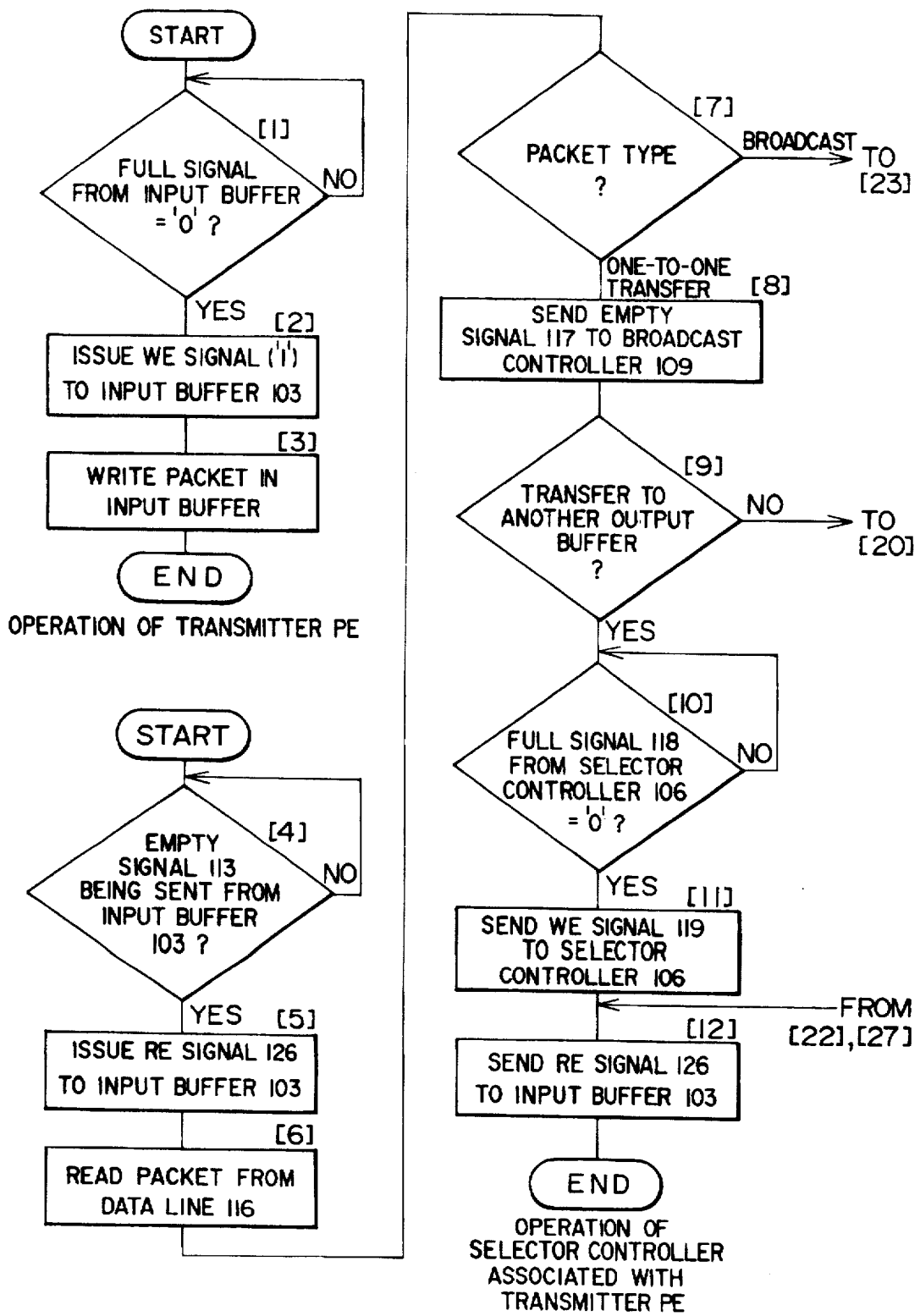
FIG. 8 is a flowchart showing an operation flow of a parallel processor system using the network in accordance with the present invention.
Figure 9:
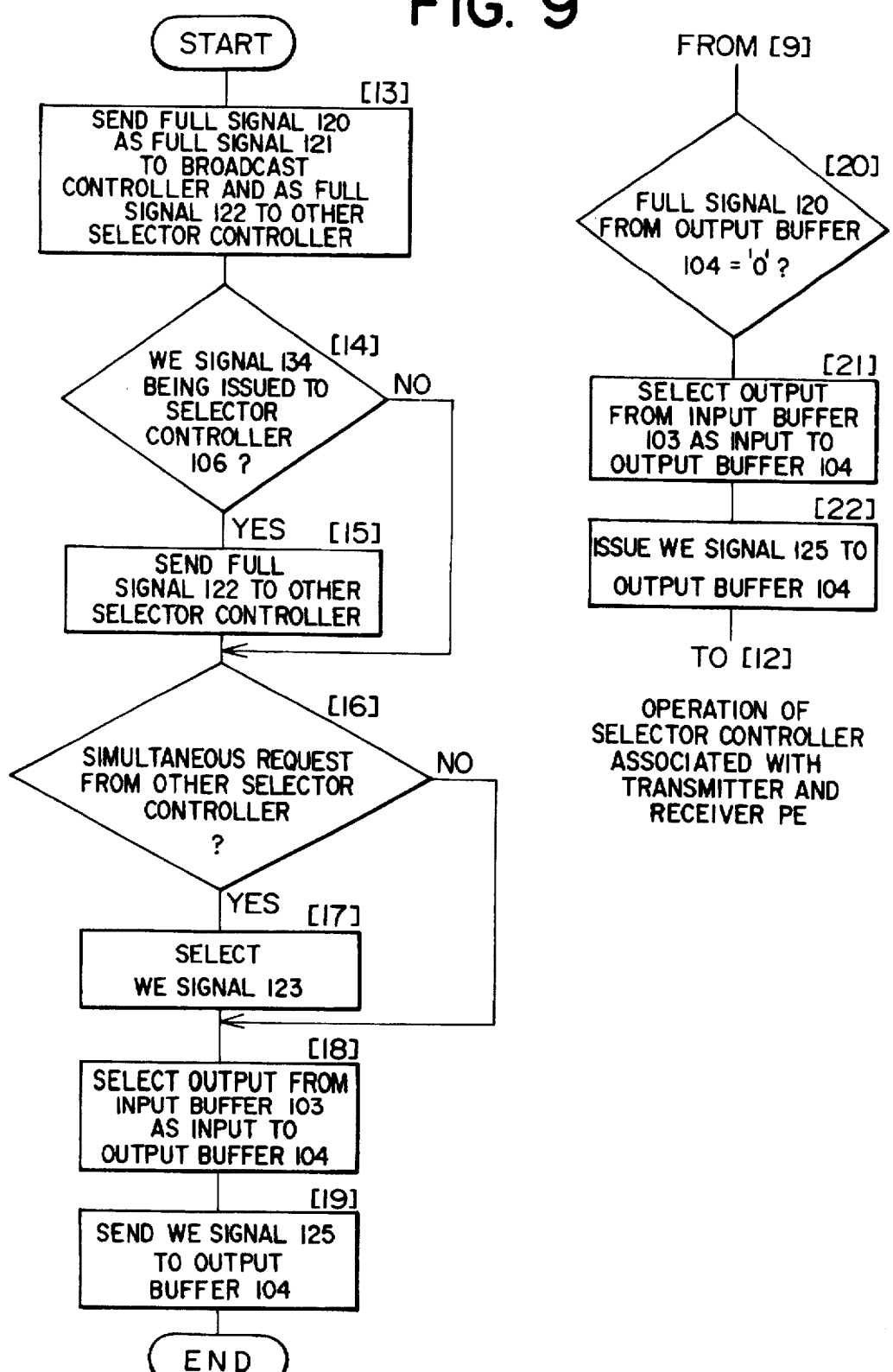
FIGS. 9 to 11 are flowcharts showing operation flows of a parallel processor system using the network in accordance with the present invention.
Figure 10:
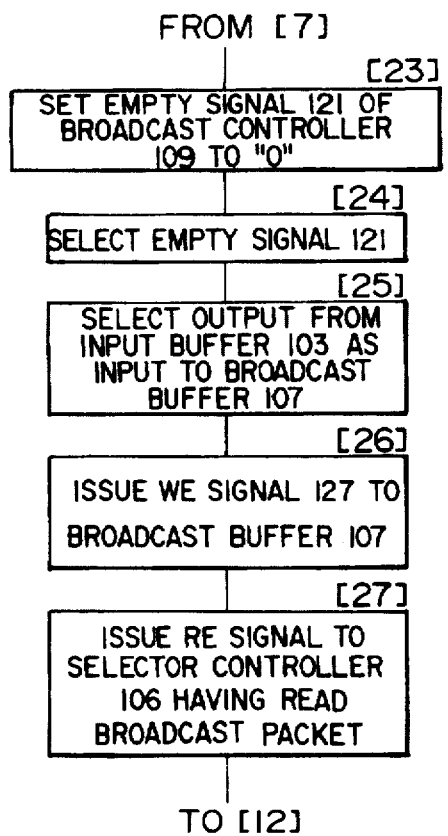
Figure 10:
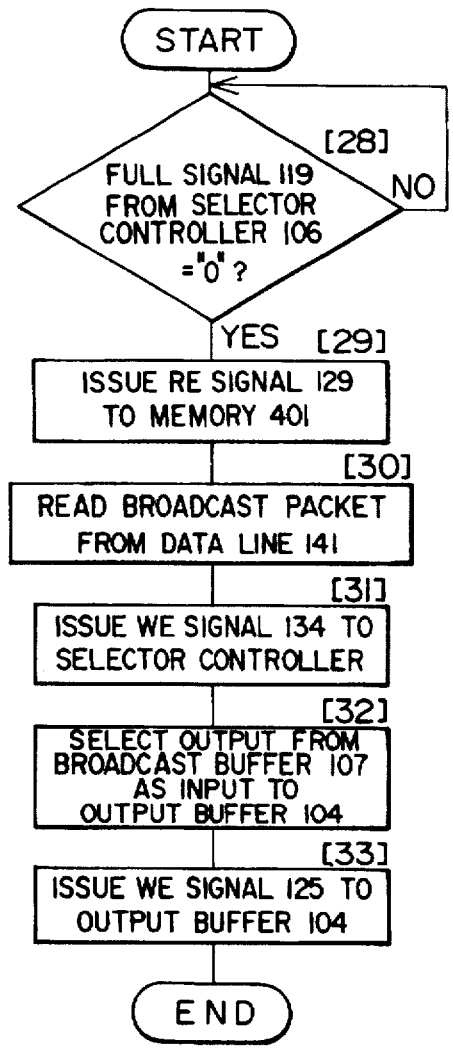
Figure 11:
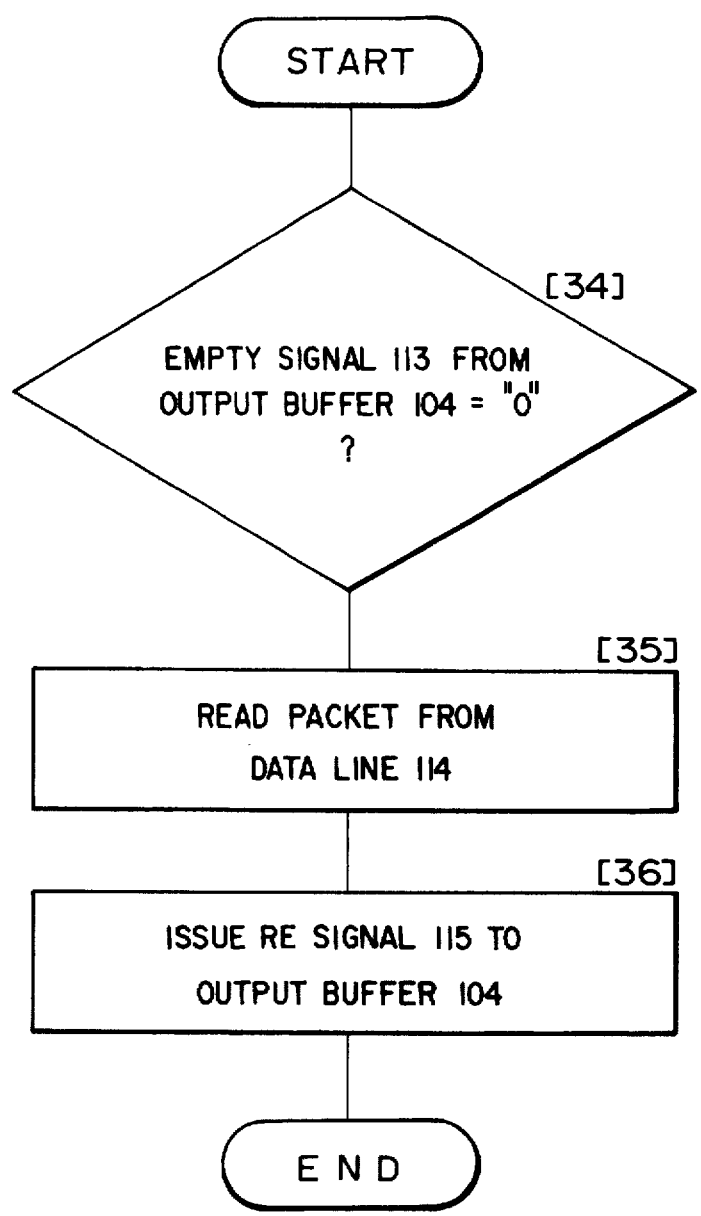

FIG. 7 shows the structure of the broadcast controller 109 prepared according to the constitution of FIG. 5. Broadcast packets are from the broadcast buffer 107 to the output buffers 104 as follows. Namely, after the first broadcast packet is completely transferred to the output buffers 104 specified as the destination of the packet, the next broadcast packet is similarly transferred to the designated output buffers 104. Description will now be given of the transfer operation of the packet to one of the output buffers 104.

The broadcast controller 109 receives from a selector controller 106 supervising the output buffer 104 a Full signal 121 designating that the packet can be stored in the output buffer 104. A priority control circuit 701 selects only one of the Full signals 121 from the plural selector controllers 106 according to a particular selection method. However, a Full signal 121 sent from an output buffer 104 to which a broadcast packet has been transferred is not selected until the packet transfer is completed for the remaining output buffers 104. The broadcast controller 109 sends a WE signal 134 to the selector controller 106 associated with the selected Full signal 121 [31] and an RE signal 129 to the broadcast buffer 107 [29]. Resultantly, the broadcast packet can be sequentially transferred to any available output buffers 104 specified by the RP of the broadcast buffer 107.

In the first and second embodiments, the network is constructed by using a crossbar switch. Since the PEs are connected to input/output ports of the network, the existence of the packet in the input buffer 103 and the states as to whether a packet can be transferred to the output buffer 104 or not represent enable or disable of the transfer and reception of the connected PEs 101.

Next, a third embodiment using a plurality of crossbar switches and exchangers 1201 between the crossbar switches and between the crossbar switch and the PE 101 is explained below.

Figure 12:
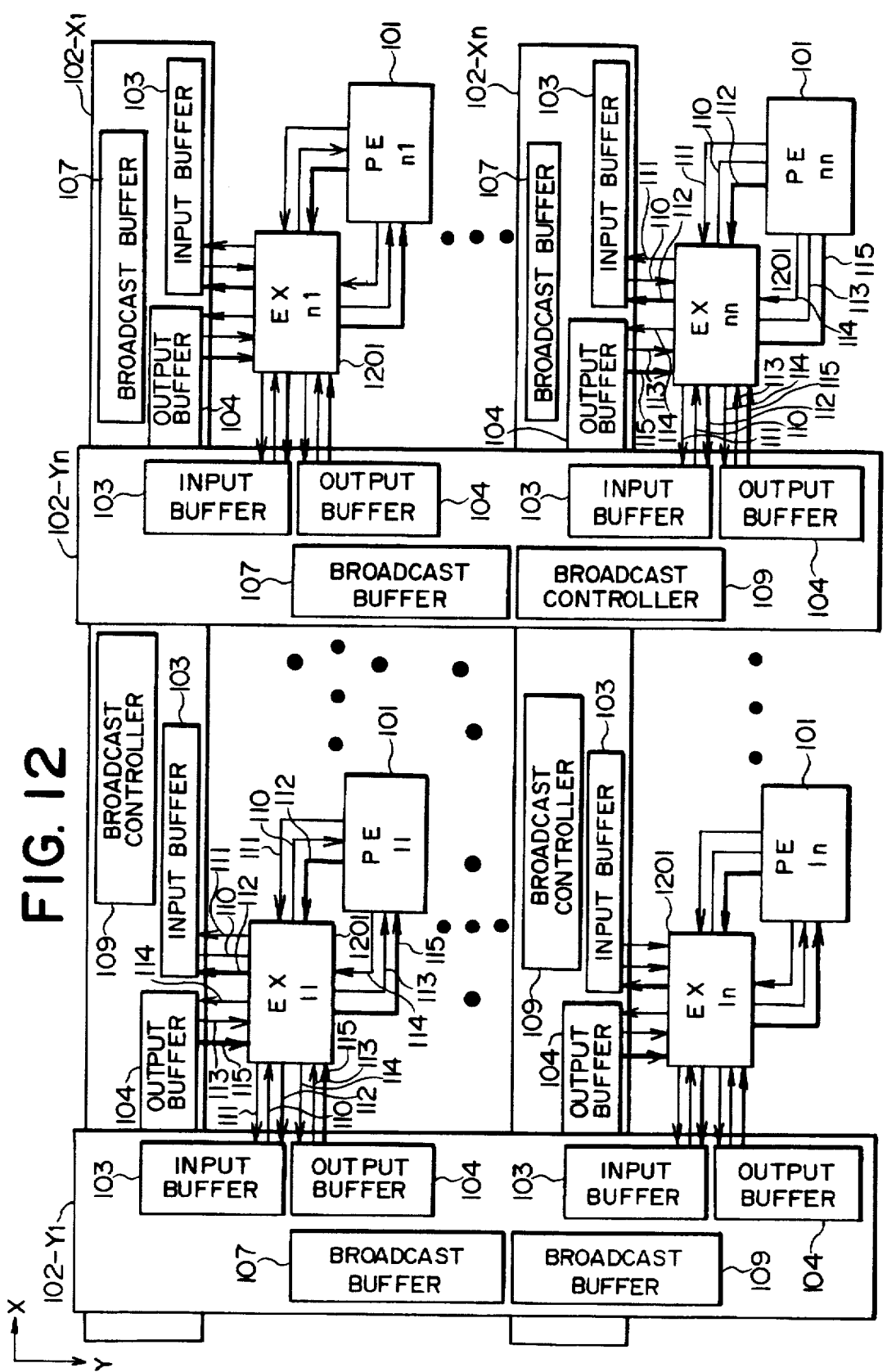
FIG. 12 is a diagram showing a whole configuration of an other embodiment in accordance with the present invention.

FIG. 12 shows the third embodiment of a parallel processor system in accordance with the present invention. In FIG. 12, the parallel processor system comprises nxn PEs 101, n+n crossbar switches 102 and nxn EXs 1201.

In this network, since there are a plurality of transfer passes for transferring the packet from an optional PE to an optional PE, a fixed routing method of giving a priority to an X direction is applied. However, another different fixed routing method may be applied. In this network, it is also allowed that the transfer passes are not fixed.

Operations in transferring the broadcast packet from PE 11 to a plurality of PE 11 to PE nn are explained below. The detailed configuration of the crossbar switch 102 are shown in FIG. 1. ps (A) Operations of the PE 11 and an EX 11 until a packet is transferred from the PE 11 to an input buffer 103 at an input port of a crossbar switch 102-X1.

When the PE 11 transfers a packet to the EX 11, the PE 11 monitors the line 110 from the EX 11. When the state of the line 110 is "0", the PE 11 issues a WE signal 111 to the EX 11 and transfers the packet to the EX 11 via the data line 112.

When the EX 11 receives the WE signal 111 from the PE 11, the EX 11 reads out a header of the packet via the data line 112. If the EX 11 recognizes that the packet is a broadcast packet from the PE, it determines that the crossbar switch 102-X1 is a crossbar switch to which the broadcast packet should be transferred. When the full signal 110 from the input buffer 103 of the crossbar switch 102-X1 is "0", the EX 11 issues a WE signal 111 requesting a write operation to the input buffer 103. When data is written in the input buffer 103 by using the WE signal 111 and the data line 112, the transferring of the packet is completed.

(B) Operations of a plurality of the selector controllers 106 and of the broadcast controller 109 until a packet is transferred to the output buffers 104 at a plurality of the output ports from the input buffer 103 of the crossbar switch 102-X1 through the broadcast buffer 107.

The operations of a plurality of the selector controllers 106 and of the broadcast controller 109 are the same as those in the first embodiment.

(C) Operations of the EX 11 to EX n1 until packets are read out from the output buffers 104 at a plurality of the output ports of the crossbar switch 102-X1 and transferred to the input buffers 103 at the input ports of each of the crossbar switches 102-Y1 to 102-Yn.

With respect to the EX 11 to EX n1, the output buffers 104 from which the packet is read out and the crossbar switches 102 to which the packet is transferred are different from each other. However, the operations of each of the EX 11 to EX n1 are the same. Therefor, the operations of only EX n1 are explained below.

When the Empty signal 113 from the output buffer 104 is "0", the EX n1 issues a RE signal 115 and read out the packet via the data line 114 and issues a RE signal 115 to the output buffer 104. Next, if the EX n1 recognizes that the packet is a broadcast packet from the crossbar switch 102-X1, it determines that the crossbar switch 102-Yn is a crossbar switch to which the broadcast packet should be transferred. When the full signal 110 from the input buffer 103 of the crossbar switch 102-Yn is "0", the EX n1 issues a WE signal 111 requesting a write operation to the input buffer 103. When data is written in the input buffer 103 by using the WE signal 111 and the data line 112, the transferring of the packet is completed.

(D) Operations of each of a plurality of the selector controllers 106 and each of the broadcast controllers 109 until packets are transferred to each of the output buffers 104 at a plurality of the output ports of the crossbar switches 102-Y1 to 102-Yn from the input buffers 103 at the input ports of each of the crossbar switches 102-Y to 102-Yn through each of the broadcast buffers 107.

The operations in transferring the packet of each of the selector controllers 106 and each of the broadcast controllers 109 of the crossbar switches 102-Y1 to 102-Yn are the same as those of (B).

(E) Operations of the EX 11 to EX nn and of the PE 11 to PE nn until packets are read out from each of the output buffers 104 at a plurality of the output ports of each of the crossbar switches 102-Y1 to 102-Yn and transferred to each of the PE 11 to PE nn.

With respect to the EX 11 to EX nn, the output buffers 104 from which the packet is read out and the PES 101 to which the packet is transferred are different from each other. However, the operations of each of the EX 11 to EX nn are the same. Therefor, the operations of only the EX nn and PE nn are explained below.

When the Empty signal 113 from the output buffer 104 of the crossbar switches 102-Y1 to 102-Yn is "0", the EX nn issues a RE signal 115 to the output buffer 104. Next, if the EX nn recognizes that the packet is a broadcast packet from the crossbar switch 102-Yn, the EX nn determines that the PE nn is the PE to which the broadcast packet should be transferred. The EX nn sets the Empty signal 113 to the PE nn to "0" so that the existence of the broadcast packet is informed.

When the Empty signal 113 to "0", the PE nn issues a RE signal 115 to the EX nn. The transferring of the packet is completed by reading out the packet via the data line 114.

In the above mentioned embodiments, a crossbar switch is used in the network. Next, a fourth embodiment using a multistage switch is explained.

Figure 13:
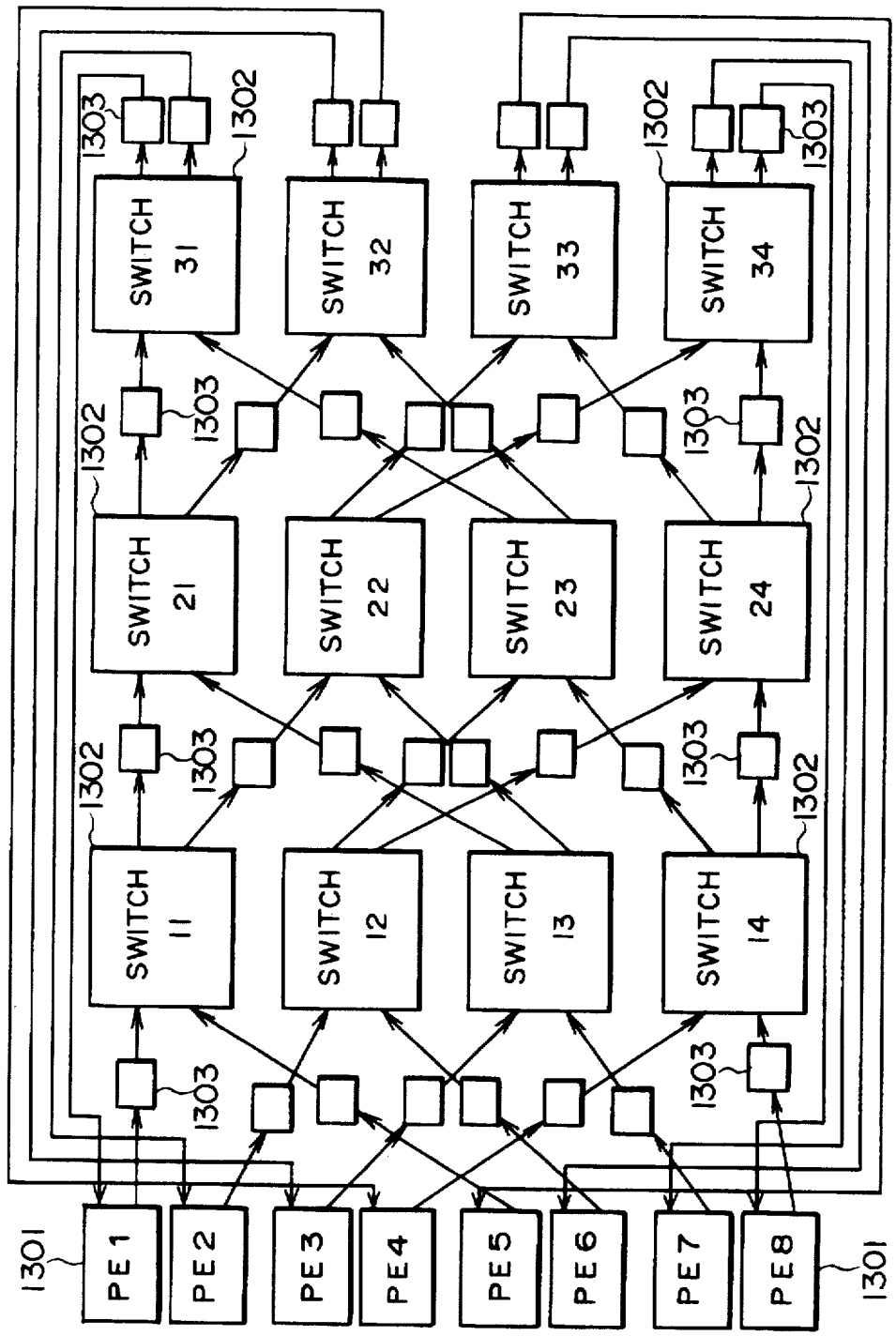
FIG. 13 is a diagram showing a whole configuration of an other embodiment in accordance with the present invention.

FIG. 13 shows the fourth embodiment of a parallel processor system in accordance with the present invention. In FIG. 13, eight PEs 1301 are connected to each other via twelve switches 1301 each of which has two inputs and two outputs. Buffers 1303 are provided between the PE 1301 and the switch 1302 and between the switches 1302.

Figure 14:
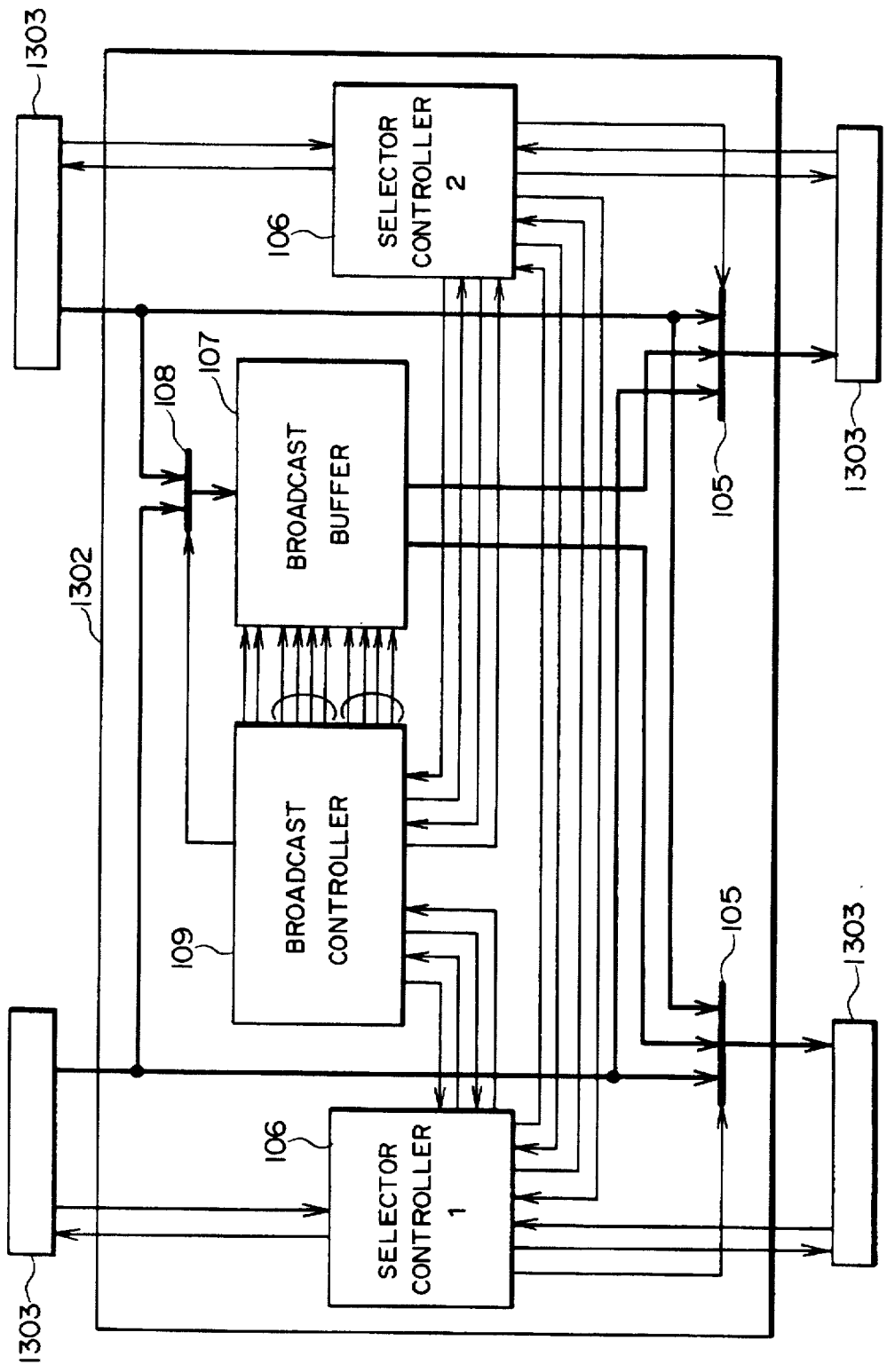
FIG. 14 is a diagram showing a configuration of a switch illustrated in FIG. 13.

FIG. 14 shows a detailed configuration of the crossbar switch 102 in FIG. 13. The switch 1302 comprises two inputs and two outputs each of which is connected to the buffer 1303, two kinds of selectors 105 and 108, a selector controller 106, a broadcast buffer 107 and a broadcast controller 109. According to such configuration, each of the buffers 1303 is connected to each of the two input ports and to each of the two output ports of each switch in FIG. 13. In FIG. 14, data lines are represented by broad lines.

Operations in transferring the broadcast packet from the PE1 to a plurality of the PE1 to PE8 in FIG. 13 are explained below. With respect to the detailed description of the crossbar switch 102 in the explanation, please see FIG. 14.

(F) Operations of the PE1 until a packet is transferred from the PE1 to the buffer 1303 connected to the input port of the switch 11.

When the PE1 transfers a packet to the buffer 1303, the PE1 monitors the line from the buffer 1303. When the buffer 1303 is in a state in which the packet can be received, the PE1 transfers the packet to the buffer 1303 via the data line.

(G) Operations of a plurality of the selector controllers 106 and of the broadcast controller 109 of the switch 11 until a packet is transferred from the buffer 1303 connected to the PE1 and to the input port of the switch 11 to each of the buffers 1303 connected to the two output ports through the broadcast buffer 107.

The operations in transferring the packet of a plurality of the selector controllers 106 and of the broadcast controller 109 are the same as those of the first embodiment, if the buffers 1303 of the switch 11 are replaced by the output buffers 104 of FIG. 1.

(H) Operations of a plurality of the selector controllers 106 and of the broadcast controllers 109 of the switches 21 and 22 until packets are transferred from the buffers 1303 one of which is connected to the output port of the switch 11 and to the input port of the switch 21 and the other of which is connected to the output port of the switch 11 and to the input port of the switch 22 to each of the buffers 1303 connected to each of the two output ports through the broadcast buffers 107 of the switches 21 and 22.

The operations in transferring the packets of each of the selector controllers 106 and each of the broadcast controllers 109 of the switches 21 and 22 are the same as those of the first embodiments, if the buffers 1303 connected to each of the output ports of the two switches are replaced by the output buffers 104 of FIG. 1. With respect to the switches 21 and 22, only the buffers connected to the input/output ports are different. The operations of each of the switches 21 and 22 are the same.

(I) Operations of a plurality of the selector controllers 106 and of the broadcast controllers 109 of the switches 31 and 32 until packets are transferred from the buffers 1303 one of which is connected to the output port of the switch 21 and to the input port of the switch 31 and the other of which is connected to the output port of the switch 21 and to the input port of the switch 32 to each of the buffers 1303 connected to each of the two output ports through the broadcast buffers 107 of the switches 31 and 32, and operations of a plurality of selector controllers 106 and of the broadcast controllers 109 of the switches 33 and 34 until packets are transferred from the buffers 1303 one of which is connected to the output port of the switch 22 and to the input port of the switch 33 and the other of which is connected to the output port of the switch 22 and to the input port of the switch 34 to each of the buffers 1303 connected to each of the two output ports through the broadcast buffers 107 of the switches 33 and 34.

The operations in transferring the packets of each of the selector controllers 106 and each of the broadcast controllers 109 of the switches 31 to 34 are the same as those of the first embodiments, if the buffers 1303 connected to each of the two output ports of each switch are replaced by the output buffers 104 of FIG. 1. With respect to the switches 31 to 34, only the buffers connected to the input/output ports are different. The operations of each of the switches 31 to 34 are the same.

(J) Operations of the PE1 to PE8 until the packets are read out from each of the output buffers 104 at a plurality of the output ports of the switches 31 to 34 and transferred to each of the PE1 to PE8.

When each of the PE1 to PE8 reads out a packet from each of the buffers 1303, each of the PE1 to PE8 monitors a line from the buffer 1303. When the existence of the packet is detected, the packet is read out via the data line, so that the transferring of the packet is completed.

Through the first embodiment to the fourth embodiment, single broadcast controller 109 and single buffer 107 are used in each of the switches 1302 or in each of the crossbar switches 102. However, the broadcast controller 109 and the buffer 107, may be used in parallel to the input buffer 103 or to the buffer 1303 for every input port.

With respect to the input buffer 103 and the output buffer 104, they may be provided in the PE or between the network 102 and the PE.

Any apparently widely different embodiments of the present invention can be made without departing from the sprit and scope thereof, it is to be understood that the invention is not limited to the specific embodiments thereof except as defined in the appended claims.

We claim:

1. A method of transferring a broadcast packet in a switch circuit having a plurality of input ports and a plurality of output ports, comprising the steps of:

(a) checking states of said plurality of output ports;

(b) transferring said broadcast packet to at least one of said plurality of output ports detected in the step (a) as being in a receive state in which a packet can be received, in response to input of the broadcast packet to one of the plurality of input ports, said transferring of said broadcast packet to said at least one of said plurality of output ports in said receive state being performed independently from transferring of said broadcast packet to other output ports not in said receive state in which a packet can not be received when said other output ports not in said receive state changes to said receive state;

(c) transferring said broadcast packet to each of said other output ports not in said receive state, as said each of said other output ports not in said receive state changes to said receive state, said transferring of said broadcast packet to said each of said other output ports having changed from not in said receive state to said receive state being performed independently from transferring of said broadcast packet to said each of said other output ports which have not changed to said receive state; and responsive to input of a one-to-one transfer packet to be transferred to one of said plurality of output ports after the input of the broadcast packet and during transfer of the broadcast packet to said output ports wherein the broadcast packet remains to be transferred to at least one of the plurality of output ports which remains in a state in which a packet cannot be received, transferring said one-to-one transfer packet to one of said plurality of output ports, designated by said one-to-one transfer packet without waiting for transfer of the broadcast packet to the at least one output port by the step (c), when the broadcast packet has already been transferred to the one output port designated by said one-to-one transfer packet.

2. A method of transferring a broadcast packet in a switch circuit having a plurality of input ports and a plurality of output ports, comprising the steps of:

(a) checking states of said plurality of output ports;

(b) transferring said broadcast packet to at least one of said plurality of output ports detected in the step (a) as being in a receive state in which a packet can be received, in response to input of the broadcast packet to one of the plurality of input ports, said transferring of said broadcast packet to said at least one of said plurality of output ports in said receive state being performed independently from transferring of said broadcast packet to other output ports not in said receive state in which a packet can not be received when said other output ports not in said receive state changes to said receive state;

(c) transferring said broadcast packet to each of said other output ports not in said receive state, as said each of said other output ports not in said receive state changes to said receive state, said transferring of said broadcast packet to said each of said other output ports having changed from not in said receive state to said receive state being performed independently from transferring of said broadcast packet to said each of said other output ports which have not changed to said receive state; and responsive to input of a one-to-one transfer packet to be transferred to one of said plurality of output ports after the input of the broadcast packet and during transfer of the broadcast packet to said output ports wherein the broadcast packet remains to be transferred to at least one of the plurality of output ports which remains in a state in which a packet cannot be received, transferring said one-to-one transfer packet to one of said plurality of output ports, designated by said one-to-one transfer packet after said broadcast packet has been transferred to said designated one output port, when said broadcast packet remains to be transferred to said designated one output port by said step (c).

3. A switch circuit having a plurality of input ports and a plurality of output ports, comprising:

(1) a broadcast buffer, connected and provided in common to said input ports, for receiving and holding at least one broadcast packet inputted from one of said input ports; and (2) a first transfer controller connected to said output ports and said broadcast buffer, for controlling transfer of said broadcast packet held in said broadcast buffer to each of said output ports, based on a state of said each output port, said transfer of said broadcast packet held in said broadcast buffer to said each output port is performed when permitted according to the state of said each output port, and said transfer is performed independently of a state of output ports other than said each output port.

4. A switch circuit according to claim 3, wherein
said first transfer controller comprises means for transferring said broadcast packet to one or more of the plurality of output ports, which are in a state in which a packet can be received, and for transferring said broadcast packet to each of other one or more of the plurality of output ports in a state in which a packet cannot be received, after said each other output port has changed to a state in which a packet can be received.

5. A switch circuit according to claim 3, wherein said broadcast buffer comprises a plurality of buffers connected and provided in common to said input ports, each buffer being provided in correspondence to one of said output ports and each buffer receiving and holding said at least one broadcast packet inputted from said one input port, and said first transfer control comprises a plurality of controllers each provided in correspondence to one of said buffers, each controller transfers the broadcast packet held in one of said buffers corresponding to said each controller to one of said output ports corresponding to said corresponding one buffer, after confirming that a state of said corresponding output port is in a state in which a packet can be received.

6. A switch circuit according to claim 3, wherein said broadcast buffer comprises a common buffer provided in common for said plurality of said output ports and for receiving and holding said broadcast packet inputted through said one input port, and said first transfer controller comprises means for transferring said broadcast packet held in said common buffer to the plurality of output ports in sequence so that said broadcast packet is transferred to one of said output ports after said broadcast packet has been transferred to another of said output ports.

7. A switch circuit having a plurality of input ports and a plurality of output ports, comprising:

(1) a broadcast buffer, connected and provided in common to said input ports, for receiving and holding at least one broadcast Packet inputted from one of said input ports;

(2) a first transfer controller connected to said output ports and said broadcast buffer, for controlling transfer of said broadcast packet held in said broadcast buffer to each of said output ports, based on a state of said each output port, said transfer of said broadcast packet held in said broadcast buffer to said each output port is performed when permitted according to the state of said each output port, and said transfer is performed independently of a state of output ports other than said each output port; and (3) second transfer controller connected to said plurality of input ports and said plurality of output ports, for transferring a one-to-one transfer packet inputted from one of said input ports to one of said plurality of output ports determined by said one-to-one transfer packet, said second transfer controller comprising means for transferring said one-to-one transfer packet to said determined output port after said broadcast packet has been transferred to said determined output port by said first transfer controller, in case the one-to-one transfer packet has been inputted when said broadcast packet remains to be transferred to the determined output port by said first transfer controller.

8. A switch apparatus for transferring a broadcast packet, and having a plurality of input ports and a plurality of output ports, comprising:

(1) a broadcast buffer connected and provided in common to said plurality of input ports for holding a broadcast packet inputted from one of said input ports;

(2) a switch circuit connected to said plurality of said input ports, the plurality of output ports and said broadcast buffer, for connecting one of an output of said broadcast buffer and said input ports to each of said output ports;

(3) a switch controller for controlling a switching operation performed by said switch circuit; and (4) a broadcast controller connected to said switch controller, for sending an instruction to said switch controller as to whether said broadcast packet in said broadcast buffer is to be transferred to each of said output ports or not, based on a state of each output port independent of a state of each output port other than said each output port.

9. A switch apparatus for transferring a broadcast packet, and having a plurality of input ports and a plurality of output ports, comprising:

(1) a broadcast buffer connected and provided in common to said plurality of input Ports for holding a broadcast packet inputted from one of said input ports;

(2) a switch circuit connected to said plurality of said input ports, the plurality of output ports and said broadcast buffer, for connecting one of an output of said broadcast buffer and said input ports to each of said output ports;

(3) a switch controller for controlling a switching operation performed by said switch circuit; and (4) a broadcast controller connected to said switch controller, for sending an instruction to said switch controller as to whether said broadcast packet in said broadcast buffer is to be transferred to each of said output ports or not, based on a state of each output port independent of a state of each output port other than said each output port;

wherein said switch controller comprises:
first means connected to said plurality of said input ports and responsive to a one-to-one transfer packet inputted from one of said input ports, for sending an instruction to said switch circuit so as to transfer said one-to-one transfer packet to one of said output ports determined by said one-to-one transfer packet; and second means, responsive to an instruction sent from said broadcast controller to transfer said broadcast packet to said determined output port for controlling said first means so as to transfer said one-to-one transfer packet after said broadcast packet has been transferred to said specified output port.

10. A switch apparatus for transferring a broadcast packet, and having a plurality of input ports and a plurality of output ports, comprising:

(1) a broadcast buffer connected and provided in common to said plurality of input ports for holding a broadcast packet inputted from one of said input ports;

(2) a switch circuit connected to said plurality of said input ports, the plurality of output ports and said broadcast buffer, for connecting one of an output of said broadcast buffer and said input ports to each of said output ports;

(3) a switch controller for controlling a switching operation performed by said switch circuit; and (4) a broadcast controller connected to said switch controller, for sending an instruction to said switch controller as to whether said broadcast packet in said broadcast buffer is to be transferred to each of said output ports or not, based on a state of each output port independent of a state of each output port other than said each output port;

wherein said switch controller comprises a plurality of selectors each provided for a pair of one of said output ports and one of said input ports, each selector selecting one of a one-to-one transfer packet inputted from one of said input ports and a broadcast packet outputted from said broadcast buffer.

11. A switch apparatus for transferring a broadcast packet, and having a plurality of input ports and a plurality of output ports, comprising:

(1) a broadcast buffer connected and provided in common to said Plurality of input ports for holding a broadcast packet inputted from one of said input ports;

(2) a switch circuit connected to said plurality of said input ports, the plurality of output ports and said broadcast buffer, for connecting one of an output of said broadcast buffer and said input ports to each of said output ports;

(3) a switch controller for controlling a switching operation performed by said switch circuit; and (4) a broadcast controller connected to said switch controller, for sending an instruction to said switch controller as to whether said broadcast packet in said broadcast buffer is to be transferred to each of said output ports or not, based on a state of each output port independent of a state of each output port other than said each output port;

wherein said switch controller comprises:

a plurality of selector controllers each provided in correspondence to one of said selectors, and said broadcast controller comprises means for selectively sending an instruction to one or more of said selector controllers to transfer a broadcast packet held in said broadcast buffer to one or more of the output ports which are in a state in which a packet can be received, wherein each selector controller comprises:

means for sending an instruction to transfer a one-to-one transfer packet to one of said selector controllers corresponding to a specified output port of said output ports determined by said one-to-one transfer packet in response to said one-to-one transfer packet inputted from one of said input ports corresponding to said each selector controller, and means for controlling a corresponding selector so as to select a broadcast packet held in said broadcast buffer or a one-to-one transfer packet inputted from an input port corresponding to other selector controller in response to a transfer instruction of said broadcast packet sent from said broadcast controller or a transfer instruction of said one-to-one transfer packet sent from said other selector controller.

12. A switch circuit having a plurality of input ports and a plurality of output ports, comprising:

(1) means for holding a broadcast packet inputted from one of said input ports and a one-to-one transfer packet inputted from one of said input ports;

(2) a first control circuit, connected to said holding means, for controlling as to whether said broadcast packet in said holding means is to be selectively transferred to each of said output ports or not, based on a state of said each output port independent of a state of each output port other than said each output port; and (3) a second control circuit, which operates in parallel with said first control circuit, for controlling as to whether said one-to-one transfer packet in said holding means is to be transferred to one of said output ports designated by said one-to-one transfer packet or not, based on a state of said designated output port independently of a state of each output port other than said designated output port.

13. A switch circuit according to claim 12, further comprising different transfer paths for transferring said broadcast packet and said one-to-one transfer packet from said holding means to each of said output ports.

14. A switch circuit according to claim 12, wherein said second control circuit comprises means for transferring said one-to-one transfer packet after said broadcast packet has been transferred to said determined port, when said broadcast packet present in said holding means remains to be transferred to said determined output port.

15. A parallel processor system comprising:

(A) a plurality of mutually connected switch circuits each of which comprises:

(1) a plurality of input ports and a plurality of output ports, (2) a broadcast buffer connected and provided in common to said input ports, for receiving and holding a broadcast packet inputted from said one of input ports, and (3) means connected to said plurality of said output ports and to said broadcast buffer for selectively transferring said broadcast packet held in said broadcast buffer to each of said output ports, based on a state of said each output port independent of a state of each output port other than said each output port; and (B) a plurality of processors each connected to one of said input ports and to one of said output ports of said switch circuits.

16. A parallel processor system according to claim 15, wherein said transferring means transfers said broadcast packet to one or more of the plurality of output ports which are in a state in which a packet can be received and for transferring said broadcast packet to each of one or more of the plurality of output ports in a state in which a packet cannot be received, after said each other output port has changed to a state in which a packet can be received.

17. A parallel processor system according to claim 15, wherein said switch circuits are connected to each other so as to constitute a multistage switch circuit network.

18. A parallel processor system according to claim 15; wherein said switch circuits comprise crossbar switches aligned in a row direction and crossbar switches aligned in a column direction, each of said crossbar switches aligned in a row direction connected to said crossbar switches aligned in a column direction.

19. A parallel processor system according to claim 18, further comprising a plurality of exchangers, wherein each output port of each of said crossbar switches aligned in the column direction and each input port of one of said crossbar switches aligned in the row direction circuits are connected via one of said exchangers, and each of said processors is connected to one of said input ports and to one of said output ports of said switch circuits via one of said exchangers.

20. A method for transferring a broadcast packet in a switch circuit having a plurality of input ports and a plurality of output ports, comprising the steps of:

(a) inputting a broadcast packet from one of said plurality of input ports;

(b) storing each of a plurality of broadcast packets into one of a plurality of buffers each provided in correspondence to one of said output ports, each of said plurality of broadcast packets being same as said inputted broadcast packet;

(c) checking states of said plurality of output ports to determine whether each output port is ready to receive a packet; and (d) controlling transfer of said plurality of broadcast packets stored in said plurality of buffers to said plurality of output ports, so that each of said plurality of broadcast packets is transferred to one of said output ports corresponding to said each buffer, depending upon a state of said corresponding output port checked by the step (c) independently of a state of each output port other than said corresponding output port.

21. A method for transferring a broadcast packet in a switch circuit having a plurality of input ports and a plurality of output ports, comprising the steps of:

(a) inputting a broadcast packet from one of said plurality of input ports;

(b) storing said inputted broadcast packet into a buffer;

(c) checking states of said plurality of output ports determine whether to each output port is ready to receive a packet; and (d) controlling transfer of said broadcast packet stored in said buffer to said plurality of output ports, depending upon states of said output ports checked by the step (c), so that said broadcast packet is transferred to one of said output ports which is in a state in which a packet can be received and said broadcast packet is transferred to another one of said output ports which is in a state in which a packet can be received after completion of transfer of said broadcast packet to said one output port independently of output ports which are in a state in which a packet can not be received.

22. A method of transferring a broadcast packet in a switch circuit having a plurality of input ports, a broadcast buffer provided in common to said input ports, and a plurality of output ports, said method comprising the steps of:

(a) storing said broadcast packet in said broadcast buffer;

(b) checking states of said plurality of output ports;

(c) transferring said broadcast packet from said broadcast buffer to at least one of said plurality of output ports detected in the step (a) as being in a receive state in which a packet can be received, in response to input of the broadcast packet to one of the plurality of input ports, said transferring of said broadcast packet to said at least one of said plurality of output ports in said receive state being performed independently from transferring of said broadcast packet to other output ports not in said receive state in which a packet can not be received when said other output ports not in said receive state changes to said receive state;

(d) transferring said broadcast packet from said broadcast buffer to each of said other output ports not in said receive state, as said each of said other output ports not in said receive state changes to said receive state, said transferring of said broadcast packet to said each of said other output ports having changed from not in said receive state to said receive state being performed independently from transferring of said broadcast packet to said each of said other output ports which have not changed to said receive state; and (e) responsive to input of a one-to-one transfer packet to be transferred to one of said plurality of output ports after the input of the broadcast packet and during transfer of the broadcast packet to said output ports wherein the broadcast packet remains to be transferred to at least one of the plurality of output ports which remains in a state in which a packet cannot be received, transferring said one-to-one transfer packet to one of said plurality of output ports, designated by said one-to-one transfer packet without waiting for transfer of the broadcast packet to the at least one output port by the step (c), when the broadcast packet has already been transferred to the one output port designated by said one-to-one transfer packet.

23. A method of transferring a broadcast packet in a switch circuit having a plurality of input ports, a broadcast buffer provided in common to said input ports, a broadcast buffer provided in common to said input ports, and a plurality of output ports, said method comprising the steps of:

(a) storing said broadcast packet in said broadcast buffer;

(b) checking states of said plurality of output ports;

(c) transferring said broadcast packet from said broadcast buffer to at least one of said plurality of output ports detected in the step (a) as being in a receive state in which a packet can be received, in response to input of the broadcast packet to one of the plurality of input ports, said transferring of said broadcast packet to said at least one of said plurality of output ports in said receive state being performed independently from transferring of said broadcast packet to other output ports not in said receive state in which a packet can not be received when said other output ports not in said receive state changes to said receive state;

(d) transferring said broadcast packet from said broadcast buffer to each of said other output ports not in said receive state, as said each of said other output ports not in said receive state changes to said receive state, said transferring of said broadcast packet to said each of said other output ports having changed from not in said receive state to said receive state being performed independently from transferring of said broadcast packet to said each of said other output ports which have not changed to said receive state; and (e) responsive to input of a one-to-one transfer packet to be transferred to one of said plurality of output ports after the input of the broadcast packet and during transfer of the broadcast packet to said output ports wherein the broadcast packet remains to be transferred to at least one of the plurality of output ports which remains in a state in which a packet cannot be received, transferring said one-to-one transfer packet to one of said plurality of output ports, designated by said one-to-one transfer packet after said broadcast packet has been transferred to said designated one output port, when said broadcast packet remains to be transferred to said designated one output port by said step (c).

* * * * *